June 30, 1959  J. R. ESHER, JR  2,892,590
APPARATUS FOR GENERATING A TRIGONOMETRIC FUNCTION
AND MULTIPLYING BY A D.C. VOLTAGE
Filed Oct. 29, 1954
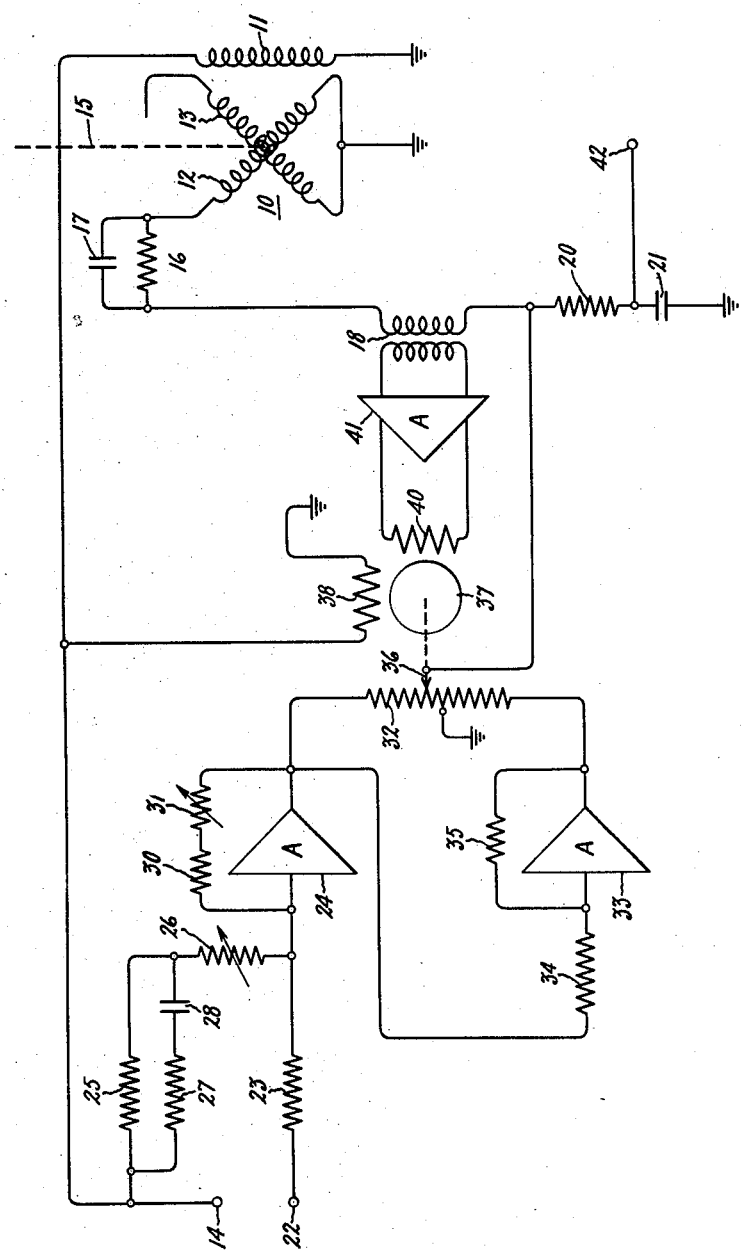
Inventor:
Joseph R. Esher, Jr.,
by Merton D. Moore
His Attorney.

United States Patent Office 2,892,590
Patented June 30, 1959

2,892,590

APPARATUS FOR GENERATING A TRIGONO-METRIC FUNCTION AND MULTIPLYING BY A D.C. VOLTAGE

Joseph Robert Esher, Jr., Schenectady, N.Y., assignor to General Electric Company, a corporation of New York Application October 29, 1954, Serial No. 465,668

4 Claims. (Cl. 235—186)

This invention relates to apparatus for generating a trigonometric function and multiplying it by a second factor, and more particularly to apparatus of that type in which the trigonometric function varies with the angular position of a shaft and the second factor is represented by a direct voltage.

There are many applications in the field of computing devices in which a vector must be resolved into its rectangular components. To perform this operation, it is necessary to generate the proper trigonometric function of the angular position of the vector and multiply it by the length of the vector to express the vector in rectangular coordinate form. Devices for accomplishing this transformation are known as coordinate resolvers.

It has been found convenient in many coordinate resolvers to represent the angular position of the vector by the angular position of a shaft, and to represent the length of the vector as a direct voltage. In this case, it is necessary to generate the proper trigonometric functions of the shaft position, generally the sine or cosine of the angle through which the shaft is rotated from a reference position, and multiply that generated function by a direct voltage representing the length of the vector. Accordingly, it is a primary object of the present invention to provide apparatus for generating a trigonometric function of a shaft position and multiplying that trigonometric function by a unidirectional voltage to produce a direct output voltage that is proportional to that product with a high degree of accuracy.

Another object is to provide such an apparatus that is both mechanically and electrically simple, relative to other devices presently available for performing similar operations.

Another object is to provide such apparatus in which the generated trigonometric function may be continuous; that is, the angular position of the shaft representing the vector may vary continuously over more than 360°.

Apparatus constructed in accordance with the invention comprises means responsive to the angular position of an input shaft for generating a desired trigonometric function and for multiplying it by an alternating voltage, and means for adding the direct voltage input to an alternating voltage, which may be the same alternating voltage by which the trigonometric function is multiplied or another alternating voltage of the same frequency. Means are provided for selecting a proportionate part of the sum of the direct voltage and the alternating voltage, whereby the alternating voltage component of the proportionate part is equal to the product of the alternating voltage and the trigonometric function. It is found that when this condition is met, the direct voltage component of the proportionate part of the sum of the direct voltage and the alternating voltage is the desired output signal; that is, when the alternating voltage component of the sum voltage is equal to the product of the alternating voltage and the trigonometric function, the direct voltage component of the proportionate part is proportional to the product of the direct voltage and the trigonometric function.

The novel features which are believed to be characteristic of the invention are set forth with particularity in the appended claims. The invention itself, however, both as to its organization and method of operation, together with further objects and advantages thereof, may best be understood by reference to the following description, taken in conjunction with the accompanying drawing in which the single figure is a schematic diagram of apparatus embodying the invention.

Looking first at the mathematical concept of the invention, it is seen that the problem is to multiply a trigonometric function, such as sin $A$, by a direct current voltage $R$ to produce ($R$ sin $A$) or ($kR$ sin $A$), where $k$ is a constant. In accordance with the invention, a first alternating voltage ($E_1$ sin $wt$) is multiplied by the trigonometric function to produce ($kE_1$ sin $wt$ sin $A$), where $k$ is a constant. Also, the direct current voltage $R$ is added to an alternating voltage ($E_2$ sin $wt$) of the same frequency as the first alternating voltage to produce ($R+E_2$ sin $wt$). Now, a proportionate part $x$ of the sum voltage is selected whereby the alternating voltage component of that proportionate part equals the product ($kE_1$ sin $wt$ sin $A$). This condition may be expressed as $$xE_2 \sin wt = kE_1 \sin wt \sin A$$

and $$x = \frac{kE_1}{E_2} \sin A$$

The direct current component $E_0$ of the selected proportionate part of the sum voltage $x(R+E_2 \sin wt)$ is found to be $$E_0 = xR$$

Substituting the value of $x$ into this equation, it is seen that $$E_0 = \frac{kE_1}{E_2} R \sin A$$

Thus, if the values of $E_1$ and $E_2$ are so arranged that $$\frac{E_1}{E_2} = 1$$

then, $E_0 = kR \sin A$, which is the desired output voltage.

Referring now to the drawing, the first portion of the apparatus to be considered comprises means for generating a trigonometric function in accordance with the angular position of an input shaft and for multiplying that trigonometric function by an alternating voltage. Although the invention is not limited thereto, such means preferably comprise a magnetic resolver 10 having a stator winding 11 and a pair of rotor windings 12 and 13. The rotor windings 12 and 13 are connected together at one end and grounded. The stator winding 11 of the resolver is connected to an input terminal 14, to which may be connected a source of alternating voltage $E_1$ sin $wt$ (not shown). The rotor of the resolver is mechanically linked to an input shaft 15 for rotation therewith to generate the trigonometric function of the angular position of the shaft.

Devices such as the resolver 10 are well known in the art and are variously called magnetic resolvers, electromagnetic resolvers or induction resolvers. For a description of such devices, reference is made to section 5.6 of a book entitled "Electronic Instruments" by Greenwood, Holdam and MacRae (McGraw-Hill, 1948). As is well known to those skilled in the art, if the stator winding 11 of the resolver is energized by an alternating voltage, a voltage is induced in the rotor windings 12 and 13 with amplitudes depending upon the angular position of the rotor and the transformation ratio $k$ of the resolver. The windings 12 and 13 are generally at right angles to each other electrically so that the voltage appearing across one winding is modulated in accordance with the sine of the angular position of the rotor, and the voltage appearing across the other winding is modulated in accordance with the cosine of the angular position. In the present case, the winding 12 is illustrated as connected into the remainder of the circuit, and it is assumed that the voltage induced thereacross is modulated in accordance with sine of the shaft angular position. However, it is to be understood that the winding 13 might be so connected, and as will be later described in detail, the circuit may be easily modified to utilize the outputs of both windings 12 and 13.

The ungrounded end of the rotor winding 12, across which appears the alternating voltage ($kE_1 \sin wt$), is connected through a resistor 16 and paralleled capacitor 17 to one end of the primary winding of a transformer 18. The other end of the transformer primary winding 18 is connected through a resistor 20 and capacitor 21 to ground.

Another portion of the apparatus comprises means for providing the sum of a direct current input voltage R and an alternating voltage having the same frequency as the voltage on the rotor of the resolver 12. The direct voltage R may be connected from the remainder of the coordinate resolver (not shown) or other device to an input terminal 22 and thence through an input resistor 23 to the input of a conventional direct current computer amplifier 24. In the present case, the direct voltage R is added to the alternating voltage ($E_1 \sin wt$) that energizes the stator winding 11 of the magnetic resolver 10. The alternating voltage input is connected to the amplifier 24 from terminal 14 through an input resistor 25 and a trimmer resistor 26. The alternating voltage input resistor 25 has connected thereacross a phase shift circuit comprising a series connected resistor 27 and capacitor 28 in order to correct for minor phase changes that might occur in other parts of the circuit. The computer amplifier 24 is provided with a feedback resistor 30 which has in series therewith a trimmer resistor 31. As is well known in the computer art, the relative values of the input resistors and the feedback resistor determine the gain obtained from the amplifier. In the present case, it is desirable to have unity gain; that is, the alternatitng voltage present at input terminal 14 and the direct voltage present at input terminal 22 are to be added together by the amplifier to obtain their sum without amplification. Therefore, the resistors 23, 25, and 30 are of equal value and the trimmer resistors 26 and 31 are provided only to compensate for minor variations in the values of other components.

The output of the computer amplifier 24, which, because of the inversion in the amplifier, is equal to the negative sum of the alternating voltage input and the direct voltage input to the amplifier, is connected to one end of a potentiometer 32. This voltage is equal to $-(R+E_1 \sin wt)$.

The output of the amplifier 24 is also connected to another direct current computer amplifier 33 through an input resistor 34. The amplifier 33 is provided with a feedback resistor 35 equal in value to input resistor 34, so that the amplifier merely inverts the input signal without amplification. The output of the amplifier 33, which is equal to the positive sum of the alternating voltage input and the direct voltage input at terminals 14 and 22, respectively, is connected to the other end of potentiometer 32. This voltage is equal to $(R+E_1 \sin wt)$.

The direct current computer amplifiers 24 and 33 are of conventional construction, and the primary requirement is that the amplifiers have linear A.C. response as well as direct current response. Numerous amplifiers are suitable for this use, a number of which are described in detail in chapter 5 of a book entitled "Electronic Analog Computers" by Korn and Korn (McGraw-Hill, 1952).

One of the outstanding features of the invention is that the linearity of the potentiometer 32 is of little importance and its accuracy does not affect the accuracy of the output of the apparatus. Therefore, the potentiometer 32 may be of any conventional type that is provided with a movable contact arm 36 and with a center tap that may be grounded. The potentiometer 32 serves as a voltage divider, and the potential present on its movable contact arm 36 is equal to $x(R+E_1 \sin wt)$, where $x$ represents the proportionate part of the voltage existing across the potentiometer 32 that is present on the contact arm 36, which voltage varies with the position of the movable contact arm.

In accordance with the invention, it is necessary so to adjust $x$ that the alternating component of the contact arm voltage $x(R+E_1 \sin wt)$ is equal to the magnetic resolver output voltage ($kE_1 \sin wt \sin A$), and, when that condition exists, to obtain the direct component of the voltage $x(R+E_1 \sin wt)$ as the output voltage. That output voltage is then equal to the desired voltage ($kR \sin A$), as was previously proven. The third portion of the apparatus performs these functions, and includes a reversible A.C. motor 37 having windings 38 and 40. The movable contact arm 36 of potentiometer 32 is mechanically connected to the rotor of the motor 37, whereby when the phase of the current through the motor winding 40 leads that of the current through the winding 38, the motor will rotate to move the contact arm 36 toward one end of the potentiometer, and when the phase of the current through the winding 40 lags that of the current in the winding 38 the motor will rotate to move the contact arm toward the other end of the potentiometer. The potentiometer contact arm 36 may be connected to the motor 37 through a conventional gear train (not shown). The motor winding 38 is connected to the alternating voltage input terminal 14, so that the current through the winding 38 is in phase with the current through the magnetic resolver stator winding 11.

The motor winding 40 is connected to the output of a conventional alternating current amplifier 41, whose input is connected to the secondary of transformer 18. The amplifier 41 may be of any conventional type, which is modified to provide a 90° phase shift in its output signal. This modification is necessary so that when the current flowing through the primary winding of the transformer is in phase with the current flowing through motor winding 38, the current flowing through motor winding 40 will differ in phase from that flowing through motor winding 38 by 90°. Thus, the motor 37 will be energized and the potentiometer contact arm 36 will be advanced toward one end of the potentiometer. Conversely, when current flows through the transformer primary in the opposite direction, the phase difference between the transformer motor windings 38 and 40 will be opposite and the potentiometer contact arm will be driven in the opposite direction.

The movable contact arm 36 of potentiometer 32 is electrically connected to a point between the primary winding of the transformer 18 and the resistor 20. Thus, if the alternating voltage output of the resolver rotor 12 which appears at the top of the primary winding of the transformer 18 is equal to the alternating voltage present on the contact arm 36 of potentiometer 32, which appears at the lower end of the primary winding of transformer 18, there will be no voltage difference across the primary winding of transformer 18. Hence, no current will flow through the primary winding of the transformer and no current will flow through motor winding 40. Thus, the motor 37 will not turn and the potentiometer contact arm 36 will remain in a fixed position. However, if the rotor of the magnetic resolver 10 is then rotated by the input shaft, its alternating voltage output changes, and the voltages at the upper and lower ends of the transformer primary winding are no longer equal. This condition causes current to flow through the transformer primary winding, which is amplified and used to energize motor winding 40. Thus, the motor 37 rotates and moves the potentiometer contact arm 36 to a point at which the alternating voltage present thereon equals the alternating voltage output of the resolver rotor 12 and there is no longer any voltage drop across the primary winding of transformer 18. Of course, the various polarities in the apparatus must be initially adjusted to cause rotation of the motor 37 in the proper direction to decrease the voltage drop across a transformer primary winding rather than to increase it.

When the system is balanced and the alternating voltage component $x(E_1 \sin wt)$ of the voltage present on potentiometer contact arm 36 is equal to the alternating voltage output ($kE_1 \sin wt \sin A$) of the magnetic resolver 10, the direct voltage component of the voltage present on the potentiometer pick-off arm 36 is the product of the direct voltage and the trigonometric function ($kR \sin A$). In order to obtain this voltage, it is necessary to filter out the alternating component. This function is performed by the A.C. load resistor 20 and the capacitor 21, the capacitor 21 being of such size that is a virtual short circuit to ground for the alternating voltage. The direct voltage component, of course, appears across primary winding of transformer 18, resistor 16 and the rotor winding 12 of the resolver. Thus, only the desired D.C. voltage is present at output terminal 42, which is connected between the resistor 20 and capacitor 21. The resistor 16 is chosen to provide a D.C. load equal to the A.C. load provided by resistor 20, thus to eliminate loading error.

If it is desired to utilize both rotor windings 12 and 13 of the magnetic resolver 10 to obtain both the sine and co-sine functions of input shaft rotation, it is necessary to duplicate certain portions of the apparatus. Two potentiometers 32 are connected in parallel with their movable contact arms connected to separate motors 37. Each motor, of course, is energized by an amplifier 41 connected to the secondary winding of a transformer 18, and the primary windings of the two transformers are each connected in the manner illustrated, one to rotor winding 12 and one to rotor winding 13. Of course, two outputs are obtained, one equal to ($kR \sin A$) and the other equal to ($kR \cos A$).

While a particular embodiment of the invention has been illustrated, it will of course be understood that the invention is not limited thereto since various modifications may be made therein, and it is contemplated by the appended claims to cover any such modifications as fall within the true spirit and scope of the invention.

What I claim as new and desire to secure by Letters Patent of the United States is:

1. Apparatus for obtaining the product of a direct voltage representing the magnitude of a vector and a trigonometric function of the angular position of the vector comprising a source of alternating voltage, means electrically coupled to said source of alternating voltage and responsive to a mechanical movement indicative of the angular position of the vector for obtaining the product of said alternating voltage and the trigonometric function of the angular position of the vector, means coupled to said source of alternating voltage and to said direct voltage for obtaining the sum of said direct voltage and said alternating voltage, means for obtaining a proportionate part of said sum voltage for the alternating voltage component thereof to equal said product of said alternating voltage and trigonometric function of the angular position of the vector, and output means connected to said last mentioned means for obtaining the direct voltage component of said proportionate part of said sum voltage.

2. Apparatus for obtaining the product of a direct voltage and a trigonometric function of the angular position of a shaft comprising means for connection to a source of alternating voltage and to said shaft for obtaining the product of said alternating voltage and the trigonometric function of the angular position of said shaft, means for connection to said source of alternating voltage and to said direct voltage for obtaining the sum of said direct voltage and said alternating voltage, means for obtaining a proportionate part of said sum voltage for the alternating voltage component thereof to equal said product of said alternating voltage and said trigonometric function of the angular position of said shaft, and output means connected to said last-mentioned means for obtaining the direct voltage component of said proportionate part of said sum voltage.

3. Apparatus for obtaining the product of a direct voltage and a trigonometric function of the angular position of a shaft comprising a magnetic resolver having a stator and a rotor, means for energizing said stator with an alternating voltage, means for rotating said rotor in accordance with the angular position of said shaft to induce a voltage across said rotor proportional to the product of said alternating voltage and the trigonometric function of the angular position of said shaft, means for obtaining the sum of said alternating voltage and said direct voltage, means electrically connected to said last-mentioned means and to said rotor and responsive to the difference between the alternating voltage component of said sum voltage and said induced voltage for selecting a proportionate part of said sum voltage for the alternating voltage component thereof to equal said induced voltage, and means for obtaining the direct voltage component of said proportionate part of said sum voltage.

4. Apparatus for obtaining the product of a direct voltage and a trigonometric function of the angular position of a shaft comprising a magnetic resolver having a stator and a rotor, means for energizing said stator with an alternating voltage, means for rotating said rotor in accordance with the angular position of said shaft to induce a voltage across said rotor proportional to the product of said alternating voltage and the trigonometric function of the angular position of said shaft, means for obtaining the positive sum of said alternating voltage and said direct voltage, means for obtaining the negative sum of said alternating voltage and said direct voltage, a potentiometer having a movable contact and connected to receive at opposite ends said positive and negative sums of said alternating voltage and said direct voltage, means for moving said contact, means electrically connected to said movable contact and to said magnetic resolver rotor and responsive to the difference between the alternating voltage component of the voltage on said movable contact and said rotor for energizing said contact moving means to move said contact to tend to eliminate said difference, and output means for obtaining the direct voltage component of the voltage present on said movable contact.

References Cited in the file of this patent

UNITED STATES PATENTS 2,725,192     Kolderup _____ Nov. 29, 1955

OTHER REFERENCES

Electronic Instruments (Greenwood, Holdam and MacRae) Radiation Laboratory Series, vol. 21, published by McGraw-Hill Book Co., New York, 1948, page 160.